A. B. DISS.
CASTER FOR FURNITURE.
APPLICATION FILED JUNE 29, 1911.
1,072,210. Patented Sept. 2, 1913.
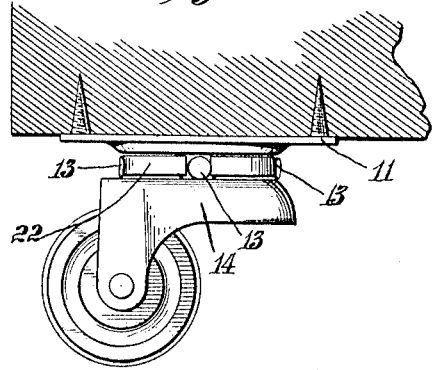
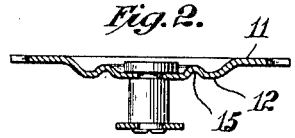 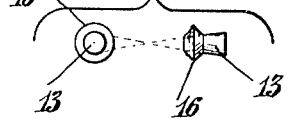
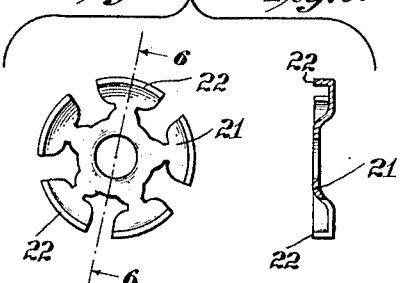
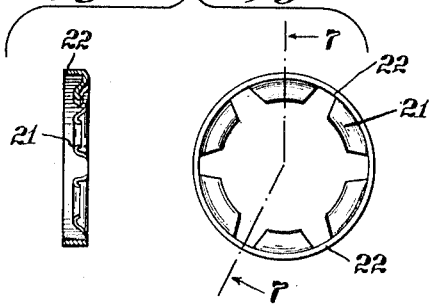
Attest: 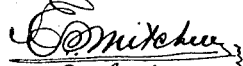
Inventor: Albert B Diss
by 
Attys

UNITED STATES PATENT OFFICE.

ALBERT B. DISS, OF NEWARK, NEW JERSEY, ASSIGNOR TO UNIVERSAL CASTER & FOUNDRY COMPANY, OF NEW YORK, N. Y., A CORPORATION OF NEW JERSEY.

CASTER FOR FURNITURE.

1,072,210.	Specification of Letters Patent.	Patented Sept. 2, 1913.

Application filed June 29, 1911. Serial No. 636,028.

*To all whom it may concern:*

Be it known that I, ALBERT B. DISS, a citizen of the United States, and a resident of Newark, New Jersey, (whose post-office address is in care of Universal Caster & Foundry Company, at Newark, New Jersey,) have invented certain new and useful Improvements in Casters for Furniture, of which the following is a description.

The invention relates primarily to means for reducing the friction of rotation upon the vertical pintle. It is equally applicable to the many different forms of casters.

The invention will be readily understood by description of the most preferred form of structure now known to me, which is shown in the accompanying drawings and is as follows:—

By the term "caster," unless the context shows a more specific meaning, I will refer to the whole caster structure, including the stationary and movable parts; and for the purpose of illustration I have selected a form having a plate for attachment to the base of the furniture and a stationary pintle about which the caster jaws gyrate.

Figure 1 is a side view of caster applied to a wooden base, shown in cross-section. Fig. 2 is a cross-section of attaching plate and pintle. Figs. 3 and 4 are side view and end view of one of the rollers. Fig. 5 is a top view of the intermediate piece of the roller housing. Fig. 6 is a cross-section of the same on the section planes 6—6. Fig. 7 is a similar section of a modified housing. Fig. 8 is a top view of such a modified housing.

The plate 11 is provided with an annular corrugation 12 forming a bearing for the six rollers 13. These rollers roll between the bearing 12 and a corresponding bearing surface upon the jaws 14. Concentric with the bearing 12 is the groove 15 in which run the guide flanges 16 of the rollers 13. A similar groove in the jaws 14 gives clearance for the flanges 16. Manifestly, the rollers 13, if accurately designed, are rolling conical surfaces converging to the center of the axis of motion, as indicated by the broken lines in Figs. 3 and 4. The flanges 16 keep the rollers in place radially. They are kept from displacement peripherally by an intermediate piece or housing 21, one design of which is shown in Figs. 5 and 6, and which loosely and approximately fits and spaces the several rollers, being cut away to receive the rollers and having an interrupted flange 22. Manifestly, the design of this housing can be varied, and a form which omits the central bearing of the housing on the pintle is shown in Figs. 7 and 8 and numbered 21.

It will be seen that in the form shown each of the rollers consists of a conical or cylindrical portion which rolls on the annular rails or tracks furnished by the opposed bearing surfaces of the plate 11 and jaws 14, and each of these rollers carries a guide flange 16, which may, and preferably should, make no contact at its periphery, because the peripheral speed of the flange will be greater than the law of proper rolling of the conical portions 13 will permit. It will be understood that if the rollers 13 make only a line contact with their bearing surfaces it will be immaterial whether they are conical, cylindrical or spheroidal, like the caster wheel in shape. It will also be seen that the downturned flange 22, extending in the interval between the jaws 14 and the upper roller-bearing plate 11, whether interrupted, as in Figs. 1–6, or continuous, as in Figs. 7 and 8, forms a protection for preventing dust and foreign bodies materially interfering with the action of the rollers.

Without limiting myself otherwise than is implied by the law, I claim the following:

1. In a caster structure, the combination of a caster wheel, jaws, pintle, flanged rollers and an upper roller-bearing plate and a housing having openings for holding and spacing the rollers and also having an exposed flange extending in the interval between said jaws and plate for protecting said rollers, the flanges traveling in annular guideways and the rolling surfaces of the rollers being approximately beveled, at least in part, to form beveled surfaces convergent to the appropriate common center of motion.

2. In a caster structure, the combination of a caster wheel, jaws, pintle, rollers and upper roller-bearing plate, said plate and jaws having opposed corrugations and concentric grooves, said rollers running on said corrugations and having guide flanges at their inner ends running in said grooves, and a housing having a flange extending between the said plate and jaws and openings which hold and space the rollers.

3. In a caster structure, the combination of a plurality of flanged rollers, and jaws and supporting plate having annular bearing surfaces which make contact with the rollers, and a housing which receives, spaces and locates the rollers; said housing having a peripheral flange 22 which is downturned.

In testimony whereof I have signed this specification in the presence of two subscribing witnesses.

ALBERT B. DISS.

Witnesses:
K. G. LE ARD,
FRANCIS A. STANTON.

---

Copies of this patent may be obtained for five cents each, by addressing the "Commissioner of Patents, Washington, D. C."